United States Patent

Moskovitz

[15] 3,668,316

[45] June 6, 1972

[54] TRANSMISSION SYSTEM FOR OVERLAPPING PULSES

[72] Inventor: Irving Moskovitz, Roslyn Heights, N.Y.

[73] Assignee: Riker Communications Inc.

[22] Filed: Jan. 31, 1968

[21] Appl. No.: 701,955

[52] U.S. Cl. ..................178/69.5 TV, 178/69.5 G, 328/157, 307/235

[51] Int. Cl. ......................H04n 5/06, H03k 5/20, H03k 5/08

[58] Field of Search .................178/69.5 TV, 69.5 G, 5.4 SY, 178/7.2, 7.2 D, 7.3 S, 7.5 S, 69.5, 69.5 F; 328/157; 340/167, 172, 209; 307/235; 179/15 A

[56] References Cited

UNITED STATES PATENTS

| | | | |
|---|---|---|---|
| 2,563,448 | 8/1951 | Aram et al. | 178/5.6 |
| 2,570,188 | 10/1951 | Aram et al. | 178/5.6 |
| 3,261,919 | 7/1966 | Aaron et al. | 179/15 SY |
| 3,261,920 | 7/1966 | Aaron | 179/15 BA |
| 3,337,691 | 8/1967 | Litchman | 179/15 |

*Primary Examiner*—Robert L. Griffin
*Assistant Examiner*—John C. Martin
*Attorney*—Bernard Malina

[57] ABSTRACT

A system for combining discrete, overlapping electrical signals and for transmitting the signals over a single conductor rather than a plurality of conductors, the composite transmitted signal being decoded at a receiving station into the discrete separate signals from which it was formed.

8 Claims, 5 Drawing Figures

INVENTOR.
IRVING MOSKOVITZ
By Murray & Linkhauer
Attorneys

INVENTOR.
IRVING MOSKOVITZ
By Murray & Linkhauer
Attorneys

INVENTOR.
IRVING MOSKOVITZ
By Murray & Linkhauer
Attorneys

TRANSMISSION SYSTEM FOR OVERLAPPING PULSES

BACKGROUND OF THE INVENTION

Although not limited thereto, the present invention is particularly adapted for use in television broadcasting stations and the like where there is a need for a large number of conductors for connecting the various output terminals of a single sync generator for the entire station to a plurality of cameras or camera locations. The sync generator produces a 3.58 megacycle color subcarrier signal and five discrete synchronizing signals, some of which overlap in time.

In systems commonly used, it is necessary to utilize six separate conductors or leads extending from the sync generator to each camera; and these leads must be closely matched in length to prevent phase shifts between the various signals. As there are usually a large number of camera locations in a single transmitting station, it can be readily appreciated that the wiring needs for the station are very extensive.

SUMMARY OF THE INVENTION

As an overall object, the present invention seeks to provide a new and improved system for transmitting discrete, overlapping electrical signals over a single conductor rather than a plurality of conductors.

More specifically, an object of the invention is to provide a system for transmitting a 3.58 megacycle color subcarrier signal and discrete synchronizing signals from a sync generator over a single conductor, thereby greatly reducing the number of conductors required for a given television station.

In accordance with the invention, a system for transmitting discrete overlapping electrical pulses over a single transmission line is provided comprising means for combining said pulses on a conductor such that at least the leading edge of each pulse appears as a step in the composite signal thus formed, means connecting said conductor to said single transmission line, and a decoder coupled to the other end of the transmission line, the decoder including means responsive to the steps in the composite signal for reforming said pulses with the same widths and phase positions which they had before they were combined into a composite signal.

The signals are preferably combined into a composite signal by means of a gating arrangement wherein only the signal of the largest amplitude will appear in the composite signal at any one time. The lowest amplitude signal is the 3.58 megacycle color subcarrier signal; and this appears in the composite signal between horizontal and vertical blanking periods. In the decoder, the composite signal is differentiated, and the differentiated signal is segregated by means of amplitude detectors such that the output of each amplitude detector will be those differentiated signals due to the blanking pulse, the sync pulse, the flag pulse, an so on. Thereafter, the outputs of the amplitude detectors are applied to multivibrators which reform the original pulses. The 3.58 megacycle color subcarrier signal on the transmission line is used to drive a regenerative oscillator; while the output of this oscillator is varied in phase to correct for any phase displacement during the transmission process. The vertical blanking pulses are differentiated at the transmitting end of the transmission line. These differentiated pulses are of much greater amplitude than the other output pulses from the sync generator and, hence, may be passed through a clamping circuit at the decoder to a multivibrator which reforms them.

The above and other objects and features of the invention will become apparent from the following detailed description taken in connection with the accompanying drawings which form a part of this specification, and in which.

Figure 1:
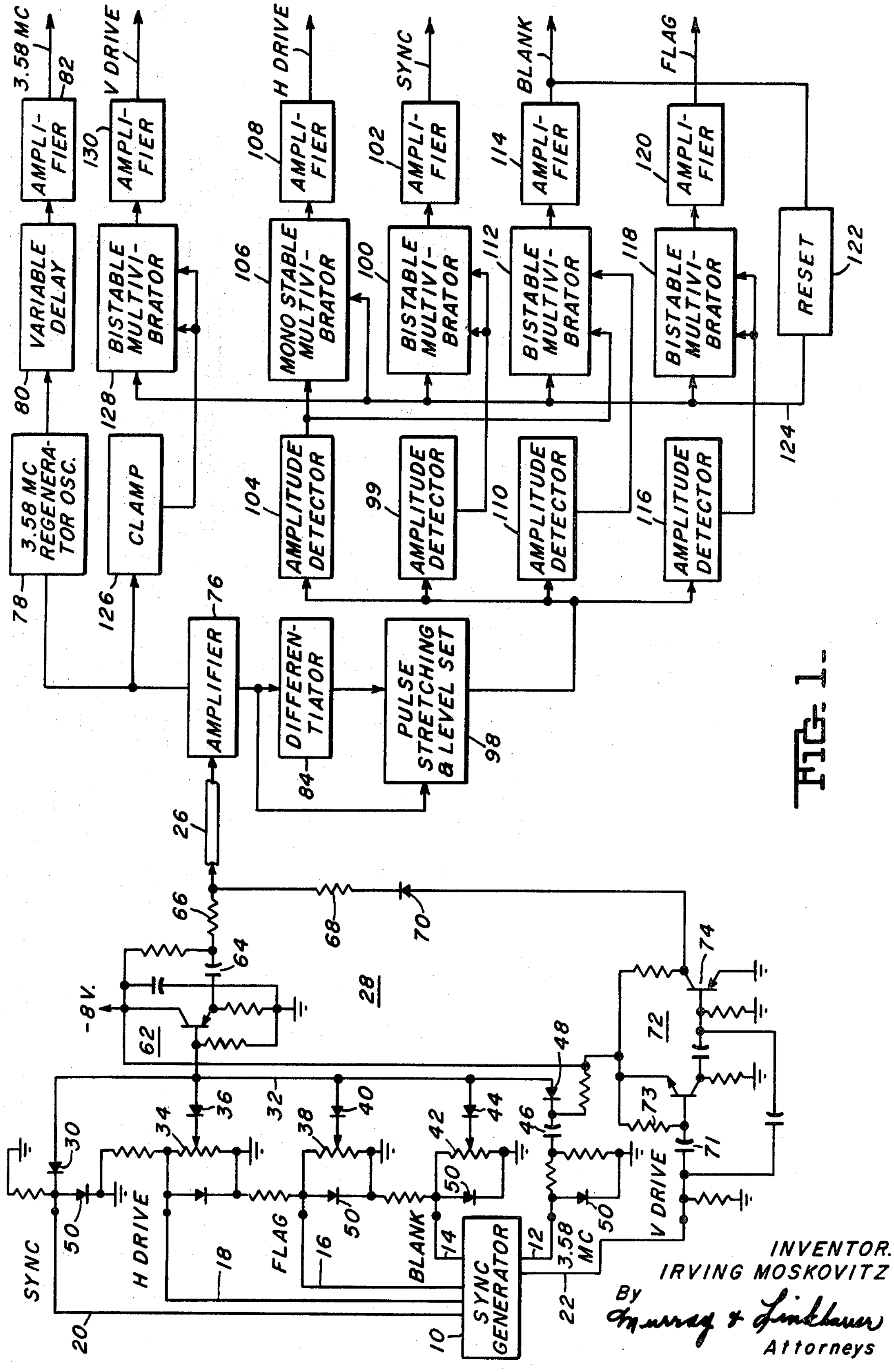
FIG. 1 is a block and schematic circuit diagram of the overall transmission system of the invention.
Figure 2:
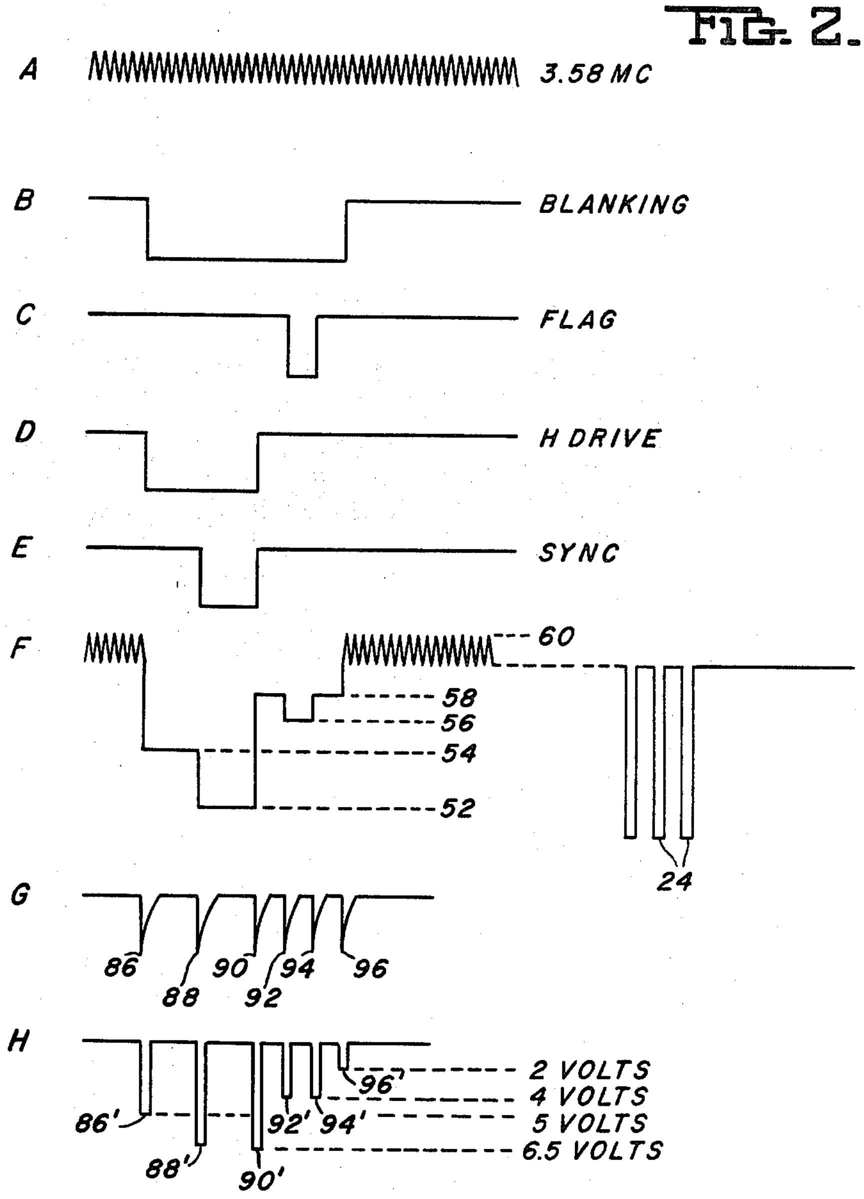
FIG. 2 illustrates waveforms appearing at various points in the circuit of FIG. 1.

With reference now to the drawings, and particularly to FIG. 1, there is shown a central sync generator 10 for a broadcasting station or the like and having five output leads. On lead 12 a 3.58 megacycle color subcarrier signal is produced, this signal being illustrated by waveform A in FIG. 2. On lead 14 a horizontal blanking pulse is produced, this pulse being illustrated by waveform B in FIG. 2. On lead 16 a flag pulse, illustrated as waveform C in FIG. 2, is produced. As will be understood, the flag pulse is utilized in color television circuitry for the purpose of applying a color burst to the blanking pulse. On lead 18 a horizontal drive pulse is produced, this pulse being illustrated by the waveform D in FIG. 2. Note that the leading edges of the blanking and drive pulses are coincident. On lead 20 a horizontal sync pulse is produced, this being illustrated by waveform E in FIG. 2. Finally, on lead 22 vertical drive pulses are produced, these being illustrated as pulses 24 in waveform F of FIG. 2.

In accordance with the usual television system, the blanking, flag, H drive and sync pulses are produced at the beginning of each horizontal scan of the electron beam of a camera tube. Between the retrace or flyback periods during which the pulses in waveforms B–E are produced, the 3.58 megacycle color subcarrier appears and modulates the black and white video signal, depending upon the color sensed by the camera. The blanking, flag, H drive and sync pulses will occur many times, depending upon the horizontal scanning frequency, before the vertical drive pulses 24 occur in the waveform. The period of the vertical drive pulses 24 is much greater than that of the blanking pulse, for example, in order to permit the electron beam of the camera to retrace from the lower edge of the picture to the upper edge where it again scans back and forth along horizontal paths.

In accordance with the present invention, all five outputs of the sync generator 10 are combined and applied to a single conductor or transmission line 26. This is accomplished by means of a gating circuit, generally indicated by the reference numeral 28. In the gating circuitry, the sync pulses are applied through diode 30 to a common conductor 32. Similarly, the H drive pulse is applied through a potentiometer 34 and diode 36 to the conductor 32; the flag pulses are applied through potentiometer 38 and diode 40 to the conductor 32; and the blanking pulses are applied though potentiometer 42 and diode 44 to the same conductor 32. The 3.58 megacycle color subcarrier signal is applied through capacitor 46 and diode 48 to this same conductor 32. Diodes 50 serve to clamp the positive edge of the pulses to ground so that there are no signals positive to ground, and so that all signals have an amplitude which is identical to the amplitude at the output of the sync generator 10.

The potentiometers 34, 38 and 42 adjust the levels of the H drive, flag and blanking pulses as applied to the common conductor 32. These potentiometers are adjusted such that the sync pulse will have the greatest amplitude; the H drive pulse will have the next largest amplitude; the flag pulse will have the next largest amplitude; and the blanking pulse will have the lowest amplitude. Thus, when the five signals are combined on the single conductor 32 they will appear as in waveform F wherein the sync pulse has the maximum voltage level 52, the H drive pulse has the voltage level 54, the flag pulse has the voltage level 56 and the blanking pulse has the voltage level 58. The ground voltage level is indicated by the level 60; and it will be noted that the 3.58 megacycle color subcarrier signal is of the lowest amplitude. It is blanked out whenever one of the other four pulses is applied to the common conductor 32.

The combined pulses on lead 32 are applied through emitter follower transistor stage 62, capacitor 64 and resistor 66 to the common transmission line 26. The V-drive pulses, on the other hand, are applied to the common transmission line 26 through resistor 68 and diode 70. Unlike the other pulses, the V-drive pulses are not applied to the lead 32. Rather, they are first applied to an emitter follower stage 72, differentiated by means of capacitor 71 and resistor 73, and amplified in amplifying stage 74. After amplification, these pulses which are of greater amplitude than the others in waveform F, are applied through the diode 70 and resistor 68 to the common transmission line 26.

At the other end of the transmission line 26, the composite signal illustrated by waVeform F is amplified in amplifier 76. The 3.58 megacycle color subcarrier is utilized to drive a 3.58 megacycle regenerative oscillator 78; and the output of this oscillator is applied to a variable delay line 80 which may be adjusted to compensate for any phase shift incurred in the regenerating process. Finally, the output of the variable delay line 80 is applied to an output amplifier 82. Instead of the regenerative oscillator 78, an automatic frequency control loop might be used, as will be understood.

The output of the amplifier 76 is also applied to a differentiator 84, hereinafter described in detail, which will produce spiked 100 nanosecond pulses of one polarity at both the leading and trailing edges of the pulses in waveform F. These 100 nanosecond pulses are illustrated by waveform G where the spiked pulse 86 occurs at the leading edges of both the blanking and H drive pulses; the spiked pulse 88 occurs at the leading edge of the sync pulse; the spiked pulse 90 occurs at the trailing edges of the sync and H drive pulses; the spiked pulses 92 and 94 occur at the leading and trailing edges, respectively, of the flag pulse; and the spiked pulse 96 occurs at the trailing edge of the blanking pulse.

The differentiated pulses at the output of circuit 84 are applied to a pulse stretching and level set circuit 98 which also has applied thereto the output of amplifier 76 (i.e., waveform F). The pulse stretching and level set circuit 98 will hereinafter be described in detail; however for purposes of the present discussion it will be sufficient to state that the circuit 98 widens the 100 nanosecond pulses in waveform G and adjusts their levels according to the levels of the pulses whose leading and trailing edges they represent. Thus, the H drive pulse 86′ in waveform H may have an amplitude of −5 volts; the pulses 88′ and 90′ at the leading and trailing edges of the sync pulse may have an amplitude of −6.5 volts; the pulses 92′ and 94′ at the leading and trailing edges of the flag pulse may have an amplitude of 4 volts; while the pulse 96′ at the trailing edge of the blanking pulse may have an amplitude of only −2 volts.

By adjusting the amplitude of the differentiated pulses at the output of differentiator 84 and by increasing their widths, they may be segregated according to amplitude in order to reform the blanking, flag, H drive and sync pulses. This is accomplished by means of four amplitude detectors. The amplitude detector 99, for example, may be adjusted to pass only those pulses having an amplitude exceeding −5 volts but less than −7 volts. Hence, it will pass the pulses 88′ and 90′ in waveform H while blocking all other pulses. These pulses 88′ and 90′ are applied to a bistable multivibrator 100 which will switch stable states in response to the pulses 88′ and 90′, thereby reconstituting or reforming the sync pulse shown in waveform E. This pulse is then applied to output amplifier 102.

The amplitude detector 104 is set to pass pulses having an amplitude greater than −4 volts, for example, but less than −6 volts. Consequently, it will pass only the pulse 86′ in waveform H to a monostable multivibrator 106 which is set to produce a pulse having the width of the original H drive pulse in waveform D. Hence, the output of the monostable multivibrator 106 will be a pulse corresponding to the H drive pulse in waveform D, with its leading edge corresponding in phase to the pulse 86′ which was produced by the leading edge of the original H drive pulse.

Up to this point, the manner in which the H drive and sync pulses are reformed has been described. The blanking and flag pulses are reformed in a similar manner. That is, the amplitude detector 110 is set to detect only those pulses having an amplitude less than −2 volts. Hence, pulse 96′ will appear at the output of amplitude detector 110. This is applied to a bistable multivibrator 112. It will be noted, however, that the output of amplitude detector 104, comprising pulse 86′ in waveform H is applied to the other side of the bistable multivibrator 112 to cause it to initially switch stable states. Hence, upon the occurrence of pulse 86′, the bistable multivibrator 112 will switch; and upon the occurrence of pulse 96′ in waveform H it will switch back to its original stable state, thereby reconstituting or reforming the blanking pulse shown in waveform D wherein the leading edge of the blanking pulse is in phase with pulse 86′ and its trailing edge is in phase with pulse 96′. The output of the bistable multivibrator 112 comprising the reformed blanking pulse is then applied to an output amplifying stage 114.

Finally, the amplitude detector 116 is adjusted to detect only those pulses having an amplitude greater than −2 volts and less than −5 volts. Hence, it will pass pulses 92′ and 94′ which are applied to the opposite sides of a bistable multivibrator 118 to cause it to reform the flag pulse shown in waveform F. This pulse is then applied to an output amplifying stage 120.

It will be noted that during each horizontal sweep cycle, the trailing edge of the blanking pulse occurs last. The blanking pulse at the output of amplifier 114, therefore, is applied through a reset circuit 122 which, upon the occurrence of the trailing edge of the blanking pulse, resets all of the multivibrators 106, 100, 112 and 118 via lead 124. In the usual case, the multivibrators will be switched back to their correct state pending receipt of additional pulses in waveform H; however the reset feature via circuit 122 and lead 124 provides a safety feature in case any of the multivibrators should misfire.

The differentiated pulses 24 in waveform F formed by the leading and trailing edges of the vertical drive pulses have a much greater amplitude than the sync pulse in waveform F. These pulses are passed through clamping circuit 126 which eliminates all pulses having an amplitude lower than that of the aforesaid differentiated pulses and thus attenuates everything except the differentiated pulses at the leading and trailing edges of the vertical blanking pulses. These differentiated pulses are applied to a bistable multivibrator 128 which reforms the vertical blanking pulses and applies them to an output amplifier 130. Thus, all of the outputs of the sync generator 10 have been combined onto a common transmission line 26 and reformed at the other end of the transmission line. As will be understood, this eliminates the need for separate cables or transmission lines for each output of the sync generator.

Figure 3:
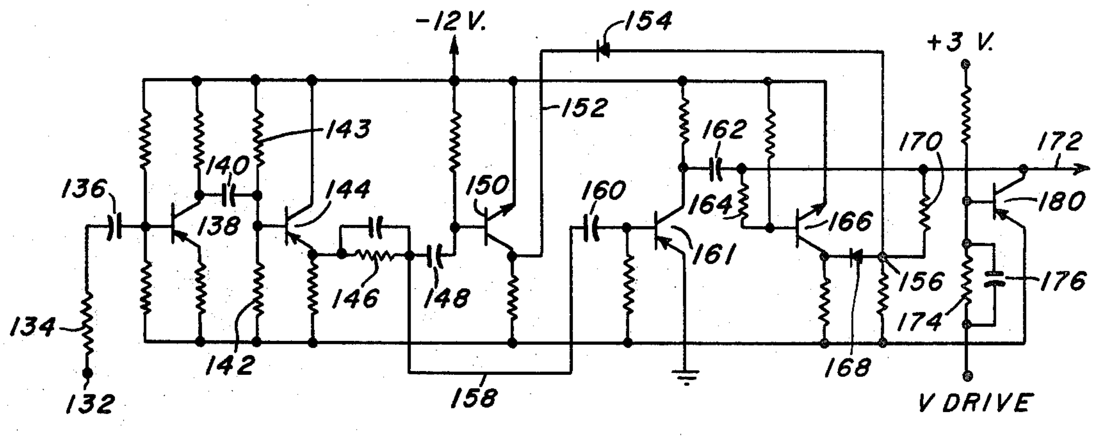
FIG. 3 is a schematic circuit diagram of the differentiator in the decoder shown in FIG. 1.

With reference now to FIG. 3, the differentiator 84 is shown in detail. The input to this circuit at terminal 132 is waveform F of FIG. 2. This signal is applied through resistor 134 and capacitor 136 to the base of a PNP transistor 138. The output of the transistor 138, appearing at its collector, is applied through capacitor 140 and resistors 142 and 143 in parallel to the base of a second PNP transistor 144. Capacitor 140 and resistor 142 comprise a differentiator such that the output appearing at the emitter of transistor 144 comprises both plus and minus going spiked pulses. The spiked pulses are applied through resistor 146 and capacitor 148 to the base of an NPN transistor 150. Each positive spiked pulse will turn on the transistor 150. The output of the transistor 150 is taken from its collector and, hence, the positive spiked pulses applied to its base are inverted and appear on lead 152. These pulses are applied through diode 154 to a summation point 156. For example, the pulse produced at the trailing edge of the H drive and sync pulses as well as the trailing edges of the flag and blanking pulses will be positive and will be applied through diode 154 as negative spiked pulses to the summation point 156.

The negative-going spiked pulses at the emitter of transistor 144 due to the leading edges of the pulses in waveform F are applied through lead 158 and capacitor 160 to the base of a PNP transistor 160. Output pulses appearing on the collector of transistor 160 are positive and, hence, are applied through capacitor 162 and resistor 164 to the base of NPN transistor 166 which produces negative spiked pulses at it collector. These negative spiked pulses are then applied through diode 168 to the summation point 156; and it will be appreciated that the waveform appearing at the summation point 156 will correspond to waveform G in FIG. 2.

The waveform G is applied through resistor 170 to an output lead 172. Also connected to the lead 172 is the collector of a PNP transistor 180. When the transistor 180 is turned on, the output on lead 172 will be effectively shorted to ground. The base of the transistor 180 is connected through the parallel combination of resistor 174 and capacitor 176 to input terminal 177 to which the V-drive pulses appearing at the output of clamp 126 are applied Thus, whenever a V-drive pulse occurs, the output on lead 172 will be shorted to ground and no V-drive pulses will be applied to the pulse stretching and level set circuit 98 of FIG. 1.

Figure 4:
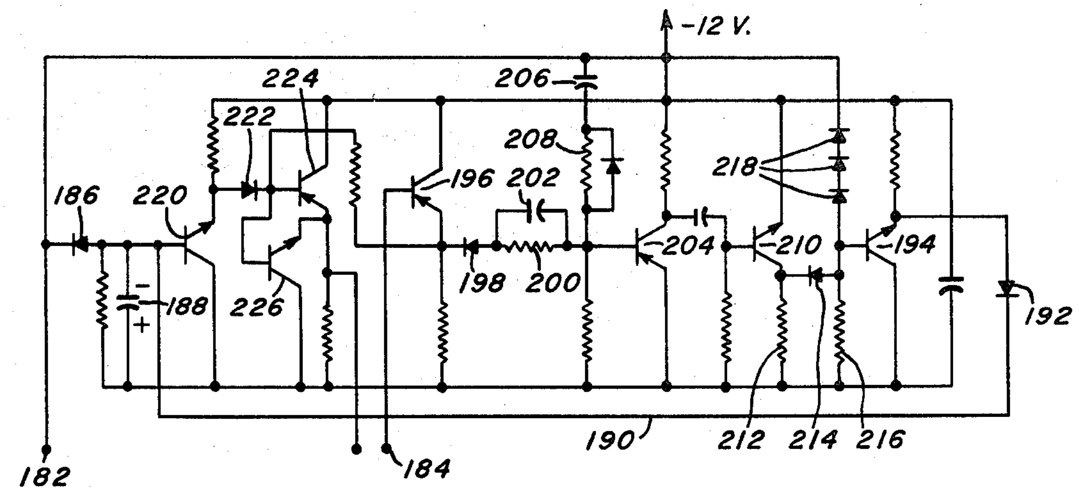
FIG. 4 is a detailed schematic circuit diagram of the pulse stretching and level set circuit in the decoder of FIG. 1.

The pulse stretching and level set circuit is shown in detail in FIG. 4. It is provided with a first input terminal 182 to which waveform F of FIG. 4 is applied. A second input terminal 184 is provided to which the differentiated pulses in waveform G are applied from the circuit of FIG. 3. The pulses in waveform F pass through a diode 186 and charge a capacitor 188 with the polarity shown. This capacitor, it will be noted, can be discharged to a level equal to the input signal, minus the voltage across diodes 218 whenever the transistor 194 is turned on and transistor 210 is turned off.

The differentiated input pulses in waveform G on input terminal 184 are applied to the base of a PNP transistor 196. These pulses are applied through diode 198 and the parallel combination of resistor 200 and capacitor 202 to the base of a PNP transistor 204, thereby turning it on. At the same time, the pulse input at terminal 182 is applied through capacitor 206 and resistor 208 to the base of transistor 204, also turning it on. Transistor 204 will be off only if transistor 196 is off and the signal at the junction of capacitor 206 and resistor 208 is not negative.

When transistor 204 turns on, it also turns on NPN transistor 210, imposing a 12-volt drop across resistor 212. This forward biases diode 214, also causing a 12-volt drop across resistor 216 and causing transistor 194 to be off. When the 100 nanosecond pulses in waveform G return to ground, the transistor 210 turns off; diode 214 becomes reverse biased; and the voltage across resistor 216 returns to the voltage at the input terminal 182 minus the drop across three dropping diodes 218. Thus, transistor 194 now turns on and capacitor 188 is discharged to the voltage at 812 minus the voltage across diodes 218. The absence of a pulse at the base of transistor 210 causes transistor 194 to be cut off. Simultaneously, the voltage at the emitter of transistor 220 (i.e., the charge on capacitor 188) is applied to the bases of transistors 224 and 226 when the diode 222 conducts. Thus, the output has a level equal to the charge on capacitor 188 for the duration of a pulse. At all other times it is zero and the charge on the capacitor can be changed only when a pulse is present.

The charge on capacitor 188 is also applied to the base of an NPN transistor 220 having its emitter connected through diode 222 to the base of a PNP transistor 224. Also connected to the base of transistor 224 is the emitter of transistor 196 which is turned on by a negative differentiated pulse in waveform G. Hence, when a pulse in waveform G is received in input terminal 184 it also turns on transistor 224; and transistor 224 remains on until capacitor 188 discharges.

Figure 5:
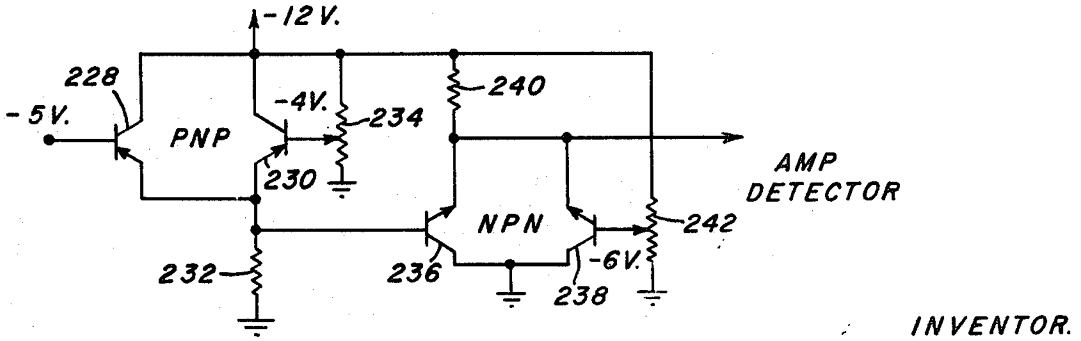
FIG. 5 is a detailed schematic circuit diagram of one of the amplitude detectors in the circuit of FIG. 1.

One type of amplitude detector which may be employed in the circuits 104, 98, 110 and 116 of FIG. 1 is illustrated in FIG. 5. It includes a first pair of PNP transistors 228 and 230 connected between a source of −12 volts and ground via resistor 232. The input signal is applied to the base of transistor 228; while the base of transistor 230 is connected to a potentiometer 234 connected between a source of −12 volts and ground. The emitter of transistor 230, in turn, is connected to the base of transistor 236. Transistor 236 is an NPN transistor and is connected in parallel with a second NPN transistor 238 between ground and the source of −12 volts through resistor 240. The base of transistor 238 is connected to a potentiometer 242 connected between ground and the source of −12 volts, while output signals are taken from the emitter of transistor 238.

Let us assume, for example, that the circuit is designed to pass signals having an amplitude between −4 volts and −6 volts. Under these circumstances, the potentiometer 234 will be adjusted to apply a −4 volt bias on the base of transistor 230 and potentiometer 242 will be adjusted to apply a −6 volt bias on the base of transistor 238. If a −5 volt pulse is now applied to the base of transistor 228, this −5 volt potential will be applied to the emitters of both of the transistors 228 and 230. Since, however, a −4 volt potential is applied to the base of transistor 230, it will not conduct and the −5 volt potential will be applied to the base of transistor 236. This −5 volt potential will appear at the emitter of transistor 236; and since a −6 volt potential is applied to the NPN transistor 238 it will not conduct and the −5 volt potential will appear at the output.

On the other hand, let us assume that the potential applied to the base of transistor 228 is −3 volts. Under these circumstances, the potential on the emitter of transistor 230 will be −3 volts while that on its base is −4 volts; the transistor 230 will conduct; and no output will appear from the circuit. On the other hand, if the input is −7 volts, for example, −7 volts will be applied to the base of transistor 236 and appear at its emitter. Since the potential on the base of NPN transistor 238, however, is only −6 volts, transistor 238 will conduct to shunt the pulse to ground and again no output will appear from the circuit. Hence, under the conditions just described, only those pulses having a magnitude between −4 volts and −6 volts will appear at the output, while all others will be attenuated. The other amplitude detectors, of course, operate on the same principle except that they are set for different voltage levels.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A system for transmitting a plurality of discrete overlapping electrical pulses over a single transmission line comprising adding means for combining said pulses on a conductor into a composite signal in which at least the leading edge of each of said pulses appears as a step in the composite signal, means connecting said conductor to said single transmission line, and decoder means connected to the other end of the transmission line, said decoder means including differentiating means responsive to said steps in the composite signal, for producing spike pulses of one polarity corresponding to each step in said composite signal and reforming means responsive to said spike pulses for producing widened pulses having the same widths and relative phase positions as said discrete overlapping pulses prior to having been combined onto said conductor.

2. The pulse transmissions system of claim 1 wherein said decoder means includes amplifier means responsive to said spike pulses of one polarity for amplifying said widened pulses to amplitudes corresponding to the amplitudes of the pulses whose leading and trailing edges they represent.

3. The pulse transmission system of claim 2 wherein said decoder means includes amplitude detectors for segregating said amplified pulses according to their amplitudes and multivibrator means connected to the outputs of said amplitude detectors.

4. The pulse transmission system of claim 3 wherein the leading edges of at least two of said discrete pulses are coincident, monostable multivibrator means responsive to one of said widened pulses for reforming one of said two pulses, and bistable multivibrator means responsive to said one widened pulse and another of said widened pulses for reforming the other of said two pulses.

5. The pulse transmission system of claim 1 wherein the adding means comprises a gating circuit incorporating means for applying the discrete overlapping pulses to said conductor at selectively variable amplitudes.

6. The pulse transmission system of claim 2 including means for applying an oscillatory signal to said single transmission line at all times except when said discrete pulses appear.

7. The pulse transmission system of claim 6 wherein said overlapping electrical pulses comprise synchronizing pulses for a television system and said oscillatory signal comprises a color subcarrier signal.

8. The pulse transmission system of claim 6 including a regenerative oscillator coupled to said other end of the transmission line and driven by said oscillatory signal for producing a continuous oscillatory signal.

* * * * *